Patented May 15, 1951

2,553,503

UNITED STATES PATENT OFFICE 2,553,503

TETRANUCLEAR MEROCYANINE SENSITIZING DYES FROM BITHIAZOLES

Lee C. Hensley, Binghamton, N. Y., assignor to General Aniline & Film Corporation, New York, N. Y., a corporation of Delaware No Drawing. Application October 10, 1950, Serial No. 189,487

4 Claims. (Cl. 260—240.1)

This invention relates to new symmetrical tetranuclear merocyanine dyes of the bithiazole type, which are particularly useful for sensitizing photographic emulsions and to photographic silver halide emulsions containing these dyes.

In the preparation of cyanine sensitizing dyes, several heterocyclic bases having two methyl groups have been used in the form of their di-quaternary salts to obtain asymmetrical dyestuffs with varying degrees of sensitizing activity and sensitizing ranges. The di-quaternary dyestuffs obtained from the dye salts of these bases have a tendency to diffuse in a gelatin layer. Dyes of this category are illustrated, for example, in United States Patents 1,994,170 and 2,108,845. Organic bases with two heterocyclic nuclei, i. e., 2,2'-dimethyl-6,6'-bibenzoxazole and 2,6-dimethylbenzo[1,2,5.4]bisthiazole, referred to in United States Patents 2,058,725 and 2,202,991 have two methyl groups, only one of which is capable of condensing with a nitrogenous heterocyclic dye salt.

I have now discovered a new class of symmetrical tetranuclear merocyanine dyes in which the central nucleus, 4,4'-bithiazole, is linked to the other two nuclei by a mono- or a poly-methine chain. These new dyes have properties which are not possessed by the known asymmetrical dyes. For instance, the dyes are not only sensitizers for both orthochromatic and panchromatic film emulsions, but are also excellent sensitizers for color film, being unaffected by the presence of color components and exhibiting the property of non-migration from the layer in which they are incorporated.

It is an object of the present invention to provide symmetrical tetranuclear merocyanine dyestuffs containing a 4,4'-bithiazole nucleus.

A further object is to provide such dyes which are added to photographic silver halide emulsions whereby the sensitivity of the emulsion is increased.

A still further object is to provide photo-sensitizing dyestuffs having a strong sensitizing activity for color film emulsions and having a lesser tendency a diffuse in gelatin layers.

Other objects and advantages of this invention will become apparent by reference to the following specification in which its preferred details and embodiments are described.

This invention is predicated upon the discovery that 1 mol of a diquaternary 2,2'-dimethyl-4,4'-bithiazole salt containing two methyl groups in the 2,2'-positions can be condensed with two mols of an N-substituted rhodanine having a reactive acetanilidomethylene group in the 5-position thereof. This discovery is wholly unexpected and surprising since the sensitizing dyes of the prior art prepared from heterocyclic bases having two methyl groups are only reactive through one of these groups, but not through both groups.

The symmetrical tetranuclear merocyanine dyestuffs prepared according to the present invention are characterized by the following general formula:

wherein R represents an alkyl group, e. g., methyl, ethyl, propyl, butyl, etc., allyl and phenyl, and R₁ represents an alkyl or aralkyl group, e. g., methyl, ethyl, propyl, isopropyl, butyl, etc., benzyl, phenethyl, and the like.

The process of preparing the above dyes comprises heating, preferably under reflux conditions, with or without a tertiary base, an alcoholic solution containing one mol of a diquaternary cyclammonium salt of 2,2'-dimethyl-4,4'-bithiazole and two mols of a rhodanine intermediate having a reactive acetanilido group linked to a mono-methine chain adjacent to a keto group of such intermediate. The rhodanine intermediates are described in United States Patent 2,186,608.

As illustrative examples of such rhodanine intermediates, reference is made to:

5 - acetanilidomethylene-3-methylrhodanine
    5 - acetanilidomethylene-3-ethylrhodanine
    5 - acetanilidomethylene-3-allylrhodanine
    5 - acetanilidomethylene - 3 - propylrhodanine
    5 - acetanilidomethylene-3-phenylrhodanine The diquaternary cyclammonium salts of 2,2'-dimethyl-4,4'-bithiazole utilized in the condensation reaction are characterized by the following general formula:

wherein $R_1$ has the same value as above and X represents an anionic acid radical, e. g., Cl, Br, I, $ClO_4$, $SO_4CH_3$, $SO_4C_2H_5$, $SO_3C_6H_4CH_3$, and the like, and are obtained by quaternizing 2,2'-dimethyl-4,4'-bithiazole characterized by the follow formula:

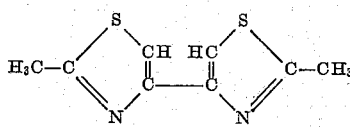

The 2,2'-dimethyl-4,4'-bithiazole is prepared in the following manner:

Eight and six-tenths grams (0.1 mol) of butanedione-2,3 (diacetyl) in 35 cc. of carbonbisulfide were treated dropwise with stirring, with a solution of 10.6 cc. of bromine in 20 cc. of carbonbisulfide at the boiling point of the carbonbisulfide. The addition was completed in 3 hours. The stirring and heating were continued another 2 hours. After cooling, the carbonbisulfide was decanted from the solid which had separated. The crystals were washed with 60–75° petroleum ether. The melting point of the crude product is 109–111° C. After crystallizing from 60–75° C. petroleum ether, the melting point was 117° C. and the yield of the product is 13.6 grams.

One gram of 1,4-dibromobutanedione-2,3 and 0.63 gram of thioacetamide were dissolved in 20 cc. of absolute methanol and warmed for 10 minutes on the steam bath. The mixture (a solid had separated) was poured into 100 cc. of water. The aqueous mixture was made acid with diluted hydrochloric acid and filtered. Upon neutralization, a brownish solid appeared in the filtrate. This solid was filtered off and recrystalized from methanol and has a melting point of 165° C.

The quaternization of the 2,2'-dimethyl-4,4'-bithiazole is effectuated by fusion with an alkyl or aralkyl halide or by heating the base with an alkyl or aralkyl halide in a sealed tube in a water bath under increased pressure in the usual manner. The alkylating agent employed may be methyl or ethyl iodide, sulfate, methyl p-toluenesulfonate, phenethyl iodide, and the like.

As solvent-diluents employed in the preparation of the new dyes of the present invention, the following alcohols may be employed: methyl, ethyl, propyl, isopropyl, butyl, benzyl, furfuryl alcohol and the like. Triethylamine, tributylamine and the like are representative of the tertiary bases which I may use.

The following examples describe in detail the methods of accomplishing the above objects, but it is to be understood that they are inserted merely for the purpose of illustration and are not to be construed as limiting the scope of the invention.

*Example I*

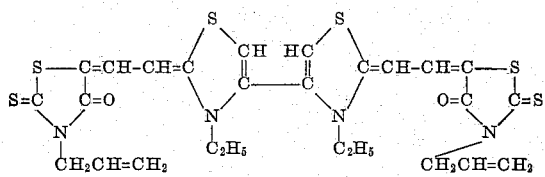

A mixture of 0.25 gram of 2,2'-dimethyl-4,4'-bithiazole diethiodide and 0.35 gram of 3-allyl-5-acetanilidomethylenerhodanine in 15 cc. of isopropanol containing a few drops of triethylamine was heated at reflux for 15 minutes. After cooling, the solid was filtered off and digested a few minutes with 15 cc. of isopropanol. After cooling the product was filtered by suction. The resulting dye had an absorption maximum at 545 m$\mu$ and sensitized a silver-chlorobromide emulsion to 640 m$\mu$ with a maximum at 610 m$\mu$.

*Example II*

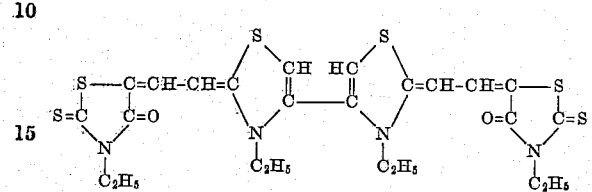

Example I was repeated with the exception that 0.33 gram of 3-ethyl-5-acetanilidomethylenerhodanine was substituted for 0.35 gram of 3-allyl-5-acetanilidomethylenerhodanine. A tetranuclear merocyanine dyestuff was obtained which has approximately the same sensitizing properties as the dyestuff of Example I.

*Example III*

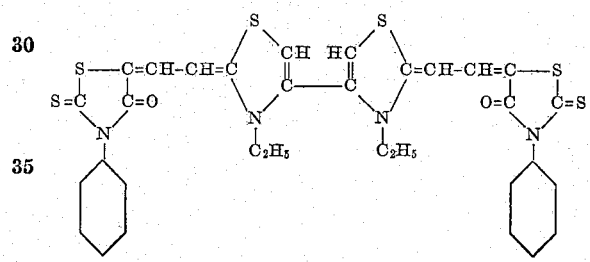

Example I was repeated with the exception that 0.4 gram of 3-phenyl-5-acetanilidomethylenerhodanine was substituted for 0.35 gram of 3-allyl - 5 - acetanilidomethylenerhodanine. The dyestuff obtained has approximately the same sensitizing characteristics as the dyestuff of Example I.

This application is a continuation in part of my application Serial No. 75,751, filed on February 10, 1949, now abandoned.

While there have been pointed out above certain preferred embodiments of the invention, the same is not limited to the foregoing examples, illustrations, or to the specific details given therein, but is capable of variations and modifications as to the reactants, proportions, and conditions employed. Accordingly, it is intended that the invention be defined only by the accompanying claims in which it is intended to include all features of patentable novelty residing therein.

I claim:

1. A symmetrical tetranuclear merocyanine dyestuff characterized by the following general formula:

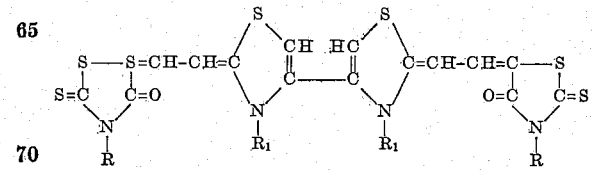

wherein R represents a member selected from the class consisting of alkyl, allyl and phenyl groups, and $R_1$ represents a member selected from the class consisting of alkyl and aralkyl groups.

2. A symmetrical tetranuclear merocyanine dyestuff of the following structure:
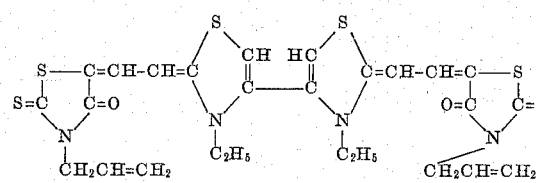
3. A symmetrical tetranuclear merocyanine dyestuff of the following structure:
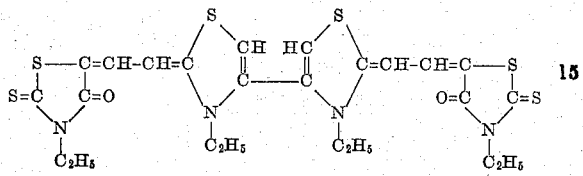
4. A symmetrical tetranuclear merocyanine dyestuff of the following structure:
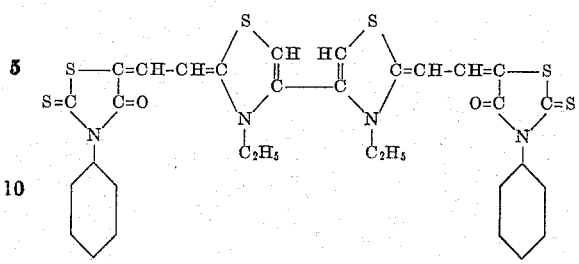
LEE C. HENSLEY.
No references cited.